R. & T. Winans.
Screw Propeller.
N° 21,918. Patented Oct. 26, 1858.
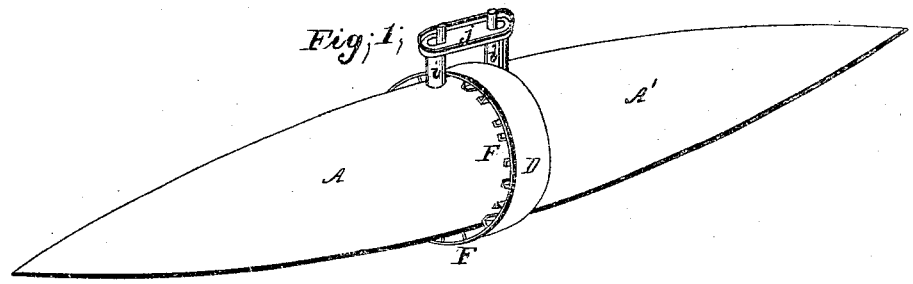
Fig. 1;
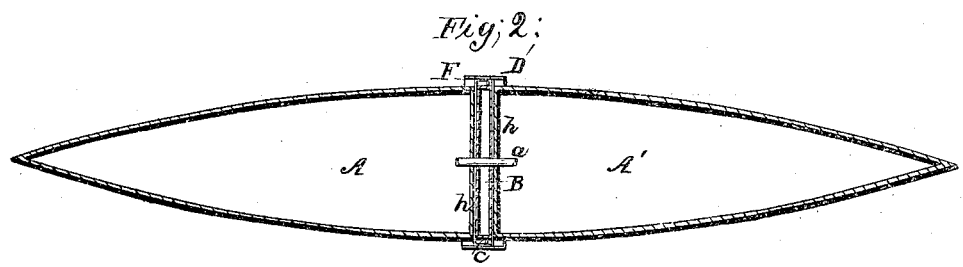
Fig. 2;
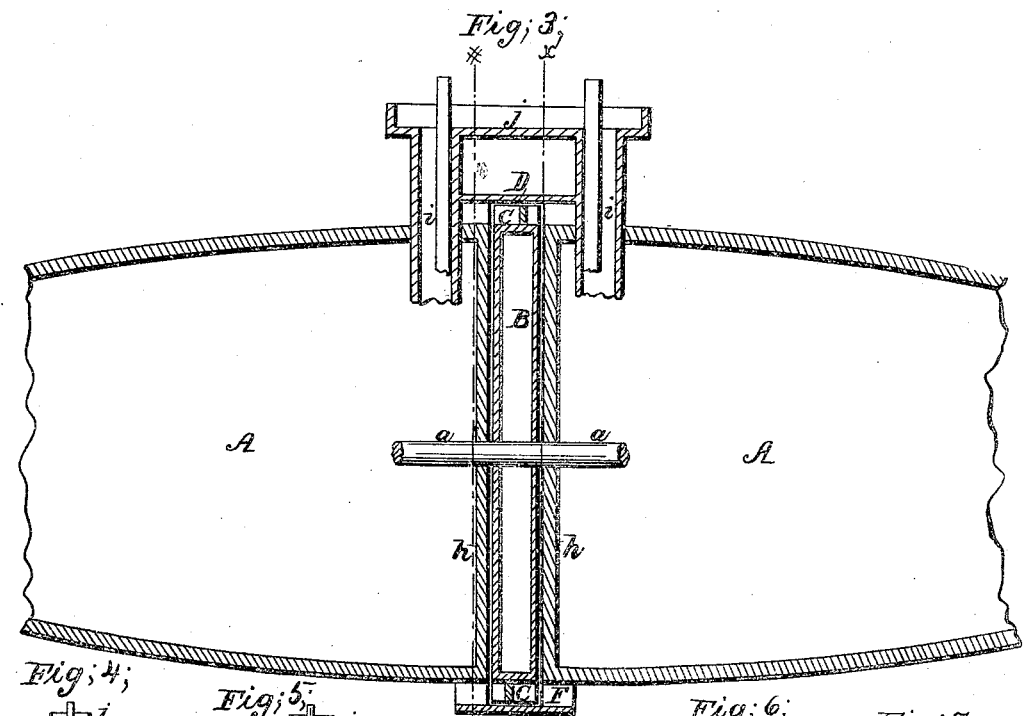
Fig. 3;
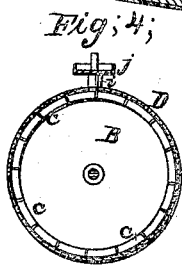
Fig. 4;
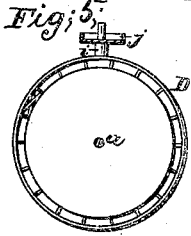
Fig. 5;
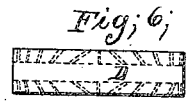
Fig. 6;
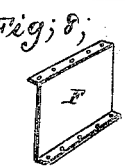
Fig. 8;
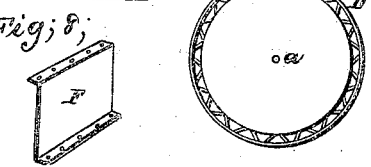
Fig. 7;
N. PETERS, PHOTO-LITHOGRAPHER, WASHINGTON, D. C.

UNITED STATES PATENT OFFICE.

ROSS WINANS AND THOMAS WINANS, OF BALTIMORE, MARYLAND.

IMPROVEMENT IN STEAM-VESSELS.

Specification forming part of Letters Patent No. 21,918, dated October 26, 1858.

*To all whom it may concern:*

Be it known that we, ROSS WINANS and THOMAS WINANS, of the city of Baltimore, in the State of Maryland, have invented a new and Improved Steam-Vessel, of which the following is a full, clear, and exact description, reference being had to the accompanying drawings, which make part of this specification, and in which—

Figure 1 represents a perspective view of our improved vessel. Fig. 2 represents a longitudinal horizontal section, and Fig. 3 a vertical longitudinal section through the axis, of the vessel. Fig. 4 represents a transverse section through the line $x\,x$ of Fig. 3. Fig. 5 represents a transverse section through the line ※ ※ of Fig. 3. Fig. 6 represents a top view of the sleeve or cylinder which surrounds the adjacent ends of the two portions of the hull, connects them, and incloses a propeller between them. Fig. 7 represents a section similar to that shown in Fig. 5, but exhibiting a modified arrangement of the ribs hereinafter described; and Fig. 8 shows one of the ribs enlarged and detached from the sleeve and hull.

Our invention, which relates more particularly to ocean steamers, and has for its object the attainment of a more constant rate of progression under different conditions of weather than is attainable in vessels of the ordinary form, consists in the combination of a hull which may be represented by the two ends of a spindle divided transversely near the middle of its length with a transverse vertical propeller occupying a space between the two portions of the spindle, which are secured together by a suitable framing or sleeve firmly attached to their adjacent ends and extending over the propeller, thus combining the two ends and the connecting-frame into a structure possessing the requisite rigidity and strength. Our invention also comprises the frame which we call a "sleeve" and the series of plates which are called "ribs" for connecting the ends of this frame respectively with the adjacent ends of the two compartments of the vessel, steadying the vessel in the manner of a keel, and, together with the sleeve, directing the water to and from the propeller; and it further consists of means for affording ingress to and egress from each of the two compartments of the vessel, a communication between, and a means of ventilating them.

The vessel is to be constructed of any suitable materials and with any kind of framing, bracing, and decks that may be deemed advisable.

The general figure of the hull is that of a spindle whose transverse section in any part is a circle and whose longitudinal section through the axis in any direction is formed of arcs of circles or other curves or series of curves and lines that by their rotation about the axis will generate a spindle.

The peculiarities and properties of such a form of hull, together with various modifications of which it is susceptible, are more fully set forth in an application for another patent made simultaneously with the application for this. In the present case, however, the spindle-shaped hull may be described with reference to three parts formed by two planes passed through it transversely not far from the middle of its length. The two end portions A A' have externally the form of the spindle, and where they are intersected by the above-mentioned planes suitable bulk-heads or partitions $h\,h$ are provided, which make the ends respectively water-tight compartments of the vessel. The space between these compartments is occupied by a propeller having its shaft $a$ in a line with the axis of the spindle. The propeller in this instance consists of a water-tight drum B, properly braced on the inside, whose periphery nearly coincides with the general surface of the spindle and carries the propelling-blades $c$, which may be of any suitable shape and have any required inclination to the axis of the drum.

The two parts of the hull are connected together and the propeller inclosed between them by the following contrivance: Around their outer surface next the space occupied by the propeller ribs or standards are fastened at short intervals. These ribs are formed of flat metallic plates and are arranged in planes passing through the axis of the hull. The ribs project a little beyond the blades of the propeller, and their inner and outer edges are flanged to facilitate fastening them by bolts or rivets to the hull at their inner edges and to the sleeve at their outer edges. The sleeve D has a length equal to that of the two sets of ribs and the space (between them) occupied by the propeller and includes the whole. This sleeve, which thus incloses the propeller and connects the two portions of the vessel together as well as the ribs, must be of sufficient strength to unite the two ends firmly and securely.

In order to give the vessel increased rigidity, the ribs or plates may at and near the top of the vessel be arranged obliquely to planes passing radially through the axis of the spindle; but in such case their inclination on opposite sides of the center should be in opposite directions, so as to present a symmetrical surface to the wind, as shown by the top view in Fig. 6.

In order to gain additional strength for resisting the force of torsion, diagonal braces may be placed between the upper ribs, and these braces may, if necessary, be flattened in the direction of the axis of the vessel, in order to diminish their resistance to the motion of the vessel in air or water. The sleeve may also be strengthened by arranging the ribs in planes parallel to the axis of the spindle, but not passing through it, so that they may be inclined toward each other in pairs, as represented in Fig. 7; or the ribs may be otherwise inclined to each other and to the axis of the spindle for the purpose of stiffening or strengthening the vessel. The shaft of the propeller should pass through stuffing-boxes in the partitions H and be connected by a crank with the engines placed below the shaft.

As a means of communication between the two portions A A′ of the hull, a suitable opening is made in the top of each portion. Around these openings are fitted water-tight pipes or towers $i$, which rise above the sleeve D and open into a common bridge or passage-way $j$, by which they are connected. These pipes or towers promote the ventilation of the parts of the vessel to which they are respectively attached, and also afford a space through which the smoke from the furnaces of the boilers may be led in pipes of the ordinary construction. The smoke-pipes may, however, be passed through openings in other parts of the hull.

Vessels of this form of hull might be steered more conveniently than by the use of the ordinary rudder. A suitable plan for this purpose is described in the patent before referred to for the spindle form of hull. The propeller being put in operation in the proper direction its motion within the sleeve D drives out the water in a sternwise current through the spaces between the after series of ribs, and the water thus driven out is replaced by an inflowing current between the forward ribs. By this means the vessel is propelled forward. The ribs F cause the water to enter and leave the inclosed space in a direction parallel to the sides of the vessel. They also operate as a keel does to steady the vessel and prevent it from rolling and serve to counteract any tendency of the propeller to careen the vessel.

This form of hull possesses, among other properties, more particularly set forth in the specification of another patent before mentioned, that of always presenting (even if the vessel should roll) a perfectly symmetrical form to the winds or waves, for planes passing through the axis of the spindle in any direction will always give the same longitudinal section and all of the transverse sections will be circular. In the present improvement we have combined these peculiar properties of the hull with similar advantages in the propeller. The blades of the propeller projecting equally on all sides of the hull will always be in action, and no matter how the vessel may roll a nearly equal area of propelling-surface will constantly be submerged, for as one side rises the other descends. By this arrangement we avoid the difficulties attendant upon the paddle-wheel steamers, in which when the vessel rolls the wheel on one side is lifted from the water, and thus vastly diminishes the resistance to the motive power, so that the engine "runs away," while when both wheels are again immersed a sudden check is given, producing in both cases shocks highly detrimental to the machinery and constantly involving the risk of breaking it. In like manner we also avoid the disadvantages of propellers placed at the stern or quarter of the vessel, which are alternately immersed and exposed when the vessel "pitches," which produces the same kind of shocks to the machinery as those first mentioned. In our vessel the wheel or propeller is situated at or near the middle of the length of the vessel, where it can never be lifted out of the water by either "pitching" or "rolling." The diameter of our propeller being equal to that of the hull itself we are enabled to give to its blades a greater velocity with a given ratio of motion in the engines than can be given to the blades in any other known screw-propeller in which the crank of the engine is connected directly to the shaft of the screws. Propellers at the stern being necessarily of far less diameter than ours require a greater rate of speed in the engine or gearing must be interposed between the engine and the screw-shaft to multiply the motion before the blades of such propellers can attain the speed practicable under our arrangement. This mode of increasing the speed of the propeller is attended both by increased friction and increased risk of derangement. Various devices have been contrived for overcoming these serious difficulties, which exist in all stern-propellers; but all such devices have been found to create new difficulties nearly or quite as great as those they cure. The engine used to drive the wheel may be placed in either of the divisions of the vessel, or engines may be employed in each division simultaneously. In either case will a great length of shaft be required, as the best position for the engines would bring them near the wheel. This arrangement of the propeller and engines is more compact than any other heretofore devised; but the advantages of this arrangement are more fully set forth in an application for another patent made simultaneously with the application for this. By this arrangement of the propeller between the two ends of the vessel we are also enabled to avoid the great resistance caused by dragging through the water the large hub and other works by which the blades of a stern-propeller must be supported. In our invention the vessel itself performs this function and no new resistances are created by the addition of means to support the propeller. The diameter of the wheel being so large, the acting-surface of the propelling-blades will also be very large. From the great area of the propelling-surface of so large a wheel it obtains a firm hold upon the water, and its efficiency is thereby augmented. The acting-surfaces of the propeller being placed so far from their axis of rotation have throughout their extent a nearly-uniform rate of motion through the water, an advantage not attainable in the ordinary stern-propeller, in which different portions have very different rates of motion, that part near the center being not only useless for propulsion, because of its slow motion, but having the positive defect of acting as a drag. A propelling-wheel arranged as we have described combines, therefore, the advantages of a paddle-wheel with its large radius and of an ordinary screw-propeller with its unintermitting action upon the water.

We have described the wheel as placed not far from the middle of the length of the vessel, because we consider this the most advantageous position; but without losing the advantages at which we aim the wheel may be placed considerably forward or abaft of this position, if the constructer should deem such a change advisable.

The sleeve D has been metioned as a continuous surface, which in many respects would be most desirable as a means of uniting the two portions of the hull and of protecting the propeller; but instead thereof bars or other framing or means of connection between the ribs of the two portions of the hull may be used. In this case the external surface of the blades will be exposed to the open water and their action will more nearly resemble that of an ordinary propeller. Another form of connection may be adopted, in which the two parts are simply united by inclined beams extending over the propeller and secured firmly to the two ends of the hull.

What we claim under this patent as our invention is—

1. The combination of a spindle-shaped hull, formed of two separate water-tight vessels united by a sleeve or framing, with a propeller, arranged and operating substantially as herein set forth.

2. The sleeve, in combination with the ribs or standards for connecting the two end portions of the spindle-shaped hull, steadying the vessel as a keel does, and directing the course of the water as it enters and leaves the space occupied by the propeller.

3. The combination of the two end portions of the spindle-shaped hull with the towers and the bridge between them, for the purpose of affording ingress to and egress from each end of the hull and a means of communication between them, and also supplying a suitable means for the ventilation of the two parts of the hull, substantially as herein set forth.

ROSS WINANS.
THOS. WINANS.

Witnesses:
M. W. MEARIS,
F. MEARIS.